(12) United States Patent
Meyer et al.

(10) Patent No.: US 8,908,630 B2
(45) Date of Patent: *Dec. 9, 2014

(54) METHOD AND ARRANGEMENT IN A TELECOMMUNICATION SYSTEM

(71) Applicant: Telefonaktiebolaget L M Ericsson (publ), Stockholm (SE)

(72) Inventors: Michael Meyer, Aachen (DE); Johan Torsner, Kyrkslätt (FI); Henning Wiemann, Aachen (DE); Magnus Stattin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,698

(22) Filed: Aug. 5, 2013

(65) Prior Publication Data

US 2013/0315179 A1    Nov. 28, 2013

Related U.S. Application Data

(63) Continuation of application No. 12/562,891, filed as application No. PCT/SE2009/050855 on Jul. 2, 2009, now Pat. No. 8,503,380.

(60) Provisional application No. 61/098,422, filed on Sep. 19, 2008.

(51) Int. Cl.
   *H04W 4/00* (2009.01)
   *H04W 72/00* (2009.01)
   *H04L 1/18* (2006.01)
   *H04W 72/04* (2009.01)

(52) U.S. Cl.
   CPC ......... *H04W 72/0406* (2013.01); *H04L 1/1854* (2013.01); *H04L 1/1812* (2013.01); *H04L 1/1887* (2013.01)
   USPC ......................................... 370/329; 455/450

(58) Field of Classification Search
   None
   See application file for complete search history.

(56) References Cited

U.S. PATENT DOCUMENTS

| 2004/0223507 | A1 | 11/2004 | Kuchibhotla et al. |
| 2008/0081651 | A1 | 4/2008 | Kuroda et al. |
| 2008/0192674 | A1 | 8/2008 | Wang et al. |
| 2009/0327828 | A1 | 12/2009 | Ojala et al. |
| 2010/0058135 | A1 | 3/2010 | Tseng |
| 2010/0248765 | A1 | 9/2010 | Chun et al. |

OTHER PUBLICATIONS

3GPP Evolved Universal Terrestrial Radio Access (E-UTRA); Medium Access Control (MAC) protocol specification (3GPP TS 36.321 version 8.2.0 Release 8). ETSI TS 136 321 v8.2.0 (Nov. 2008).

3GPP "Summary of the email discussion on remaining issues on Semi Persistent Scheduling." 3GPP TSG-RAN WG2 #62bis. R2-083144. Jun. 30-Jul. 4, 2008. Warsaw, Poland.

Email Rapporteur. Summary of the Email Discussion on Remaining Issues on Semi Persistent Scheduling. 3GPP TSG-RAN Wg2 #63; Tdoc R2-083900. Jeju, Korea, Aug. 18-22, 2008.

Samsung C-RNTI and NDI for SPS. 3GPP TSF-RAN2#63 Meeting Jeju, South Korea. Agenda Item:6.1.1.3 Tdoc R2-084464, Aug. 2008.

*Primary Examiner* — Afshawn Towfighi

(57) ABSTRACT

The present invention relates to a method in a cellular communication system, for avoiding errors in a HARQ process, wherein an NDI flag is used both for indicating either semi-persistent scheduling, SPS activation or SPS retransmissions, and also for indicating, by toggling of the flag, a new transmission in dynamic scheduling mode. The method comprises the steps of receiving, in a scheduling message, an indication that dynamically scheduled transmission will take place; if a semi persistent resource has occurred for the same HARQ process since a previously received indication for dynamically scheduled transmission, then considering the NDI flag to be toggled regardless of the value of the NDI flag. Thus, if the condition is fulfilled, a UE will always regard the NDI flag as indicating or requesting a new data transmission.

18 Claims, 9 Drawing Sheets

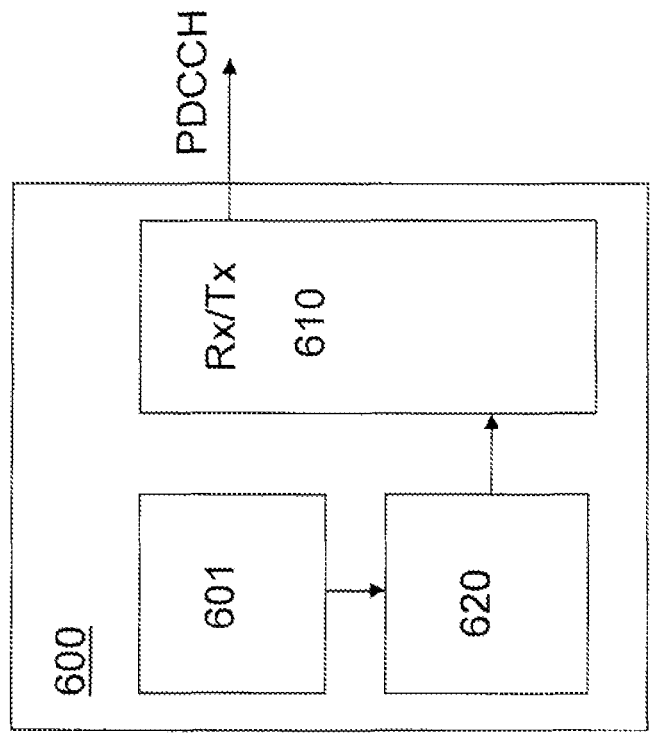
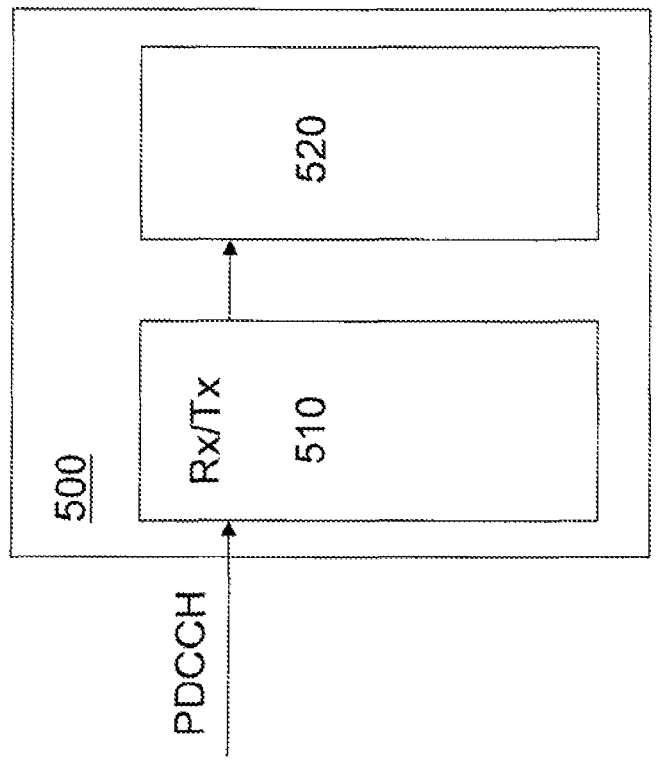
Fig. 6
Fig. 5

METHOD AND ARRANGEMENT IN A TELECOMMUNICATION SYSTEM

CLAIMING BENEFIT OF PRIOR FILED U.S. APPLICATION

This application is a continuation of U.S. patent application Ser. No. 12/562,891, filed Sep. 18, 2009, which corresponds to the national-stage entry International Application PCT/SE2009/050855, with an international filing date of Jul. 2, 2009, and which claims the benefit of U.S. Provisional Application No. 61/098,422, filed Sep. 19, 2008.

The contents of all of the preceding are hereby incorporated by reference herein.

FIELD OF THE INVENTION

The present invention relates to HARQ processes used for both semi-persistent scheduling and dynamically scheduled transmissions.

BACKGROUND

In order to achieve efficient link utilization, modern radio interface protocols support Hybrid Automatic Repeat request (HARQ). A HARQ transmission is characterized by transmitting a channel-encoded (e.g., by using a Turbo Code) data unit to the receiver. The receiver replies with a feedback signal that indicates either the successful reception (ACK) or the unsuccessful reception (NACK) In case of a received NACK, the data sender retransmits the same or another so-called redundancy version of the same data unit. The HARQ receiver soft-combines all received redundancy versions for the particular data unit. For each terminal there is one HARQ entity in the transmitting unit, e.g. a base station such as an eNodeB and one HARQ entity in the receiving unit, e.g. a user equipment, UE. Each HARQ entity hosts of a number of parallel HARQ processes.

The LTE radio access is intended to use scheduled transmission, i.e., shared transmission resources can be assigned to users on a very short time scale. The scheduler deciding on the resource allocation for uplink transmission is located in the base station. The main mode of operation for the scheduler in LTE is assumed to be dynamic scheduling whereby the base station transmits scheduling messages, i.e. uplink grants or downlink assignments, to the UEs to indicate which physical resources they have been allocated for uplink transmission and downlink reception. The base station also indicates how the data transmission shall be coded and modulated in both uplink and downlink. For downlink, where an asynchronous HARQ is assumed, information comprising HARQ process id and redundancy version is included on a control channel as part of the scheduling assignment. Since for the uplink a synchronous HARQ protocol is assumed, the employed HARQ process ID and the redundancy version are coupled to the transmission timing. Thus this information is neither sent in the uplink grant nor in parallel to the uplink transmission on an uplink control channel. Instead, both sender and receiver can derive process ID and redundancy version from the transmission status.

The LTE MAC specification supports two different scheduling modes. Dynamic scheduling is the mode in which each initial (new) transmission of data is indicated via a control channel (PDCCH, Physical Downlink Control Channel) Semi-persistent scheduling (SPS) is the mode in which each initial (new) transmission is made on pre-assigned resources, i.e. the radio resources are known in the time and frequency domain.

The SPS technique thus makes assignments (downlink data transmission) or grants (uplink data transmission) for the first transmission of data superfluous and thus saves control signaling resources.

The dynamic scheduling requires relatively much signaling overhead. In order to reduce this overhead, it has been decided in 3GPP to support so called semi-persistent scheduling (SPS). In SPS the periodicity of a scheduling grant (uplink) or scheduling assignment (downlink) is configured via an RRC, Radio Resource Control, protocol. The SPS is started by transmitting a grant/assignment on the PDCCH.

In LTE the identification of UEs on the PDCCH is done by reusing the CRCr Cyclic Redundancy Check r bits. The UE identity (typically C-RNTI) is scrambled with the CRC such that when a message is transmitted on PDCCH only the UE that de-scrambles with the correct C-RNTI will have a successful CRC. Other UEs will scramble with a different C-RNTI and their CRC will not be successful. Thus they will discard the command on the PDCCH. For SPS a separate C-RNTI is used, the SPS C-RNTI. Thus the UE can distinguish if a received assignment/grant on the PDCCH is a dynamic grant/assignment or a semi persistent grant/assignment based on which C-RNTI is used. The base station is responsible for assigning the different C-RNTIs uniquely to the UEs.

Semi-persistent scheduling operation thus has the following characteristics:

Configuration of SPS is done via the RRC protocol r i.e'r the resources that might be used for new transmissions (opposed to HARQ retransmissions) are configured.

If SPS is configured r the actual activation is done with a PDCCH message. Thus r a PDCCH signal is used to activate the SPS resource usage with the RRC-configured parameters.

New HARQ transmissions are transmitted at the given SPS resource allocations.

Required retransmissions are dynamically scheduled (but still the HARQ process is a semi-persistent process. This should not be confused with a dynamic HARQ transmission where the first transmission is dynamically scheduled) i.e., a PDCCH message is used to indicate the retransmission.

A HARQ process used for semi-persistent scheduling can still be used for dynamically scheduled transmission, i.e., a certain HARQ process is not tied to either SPS or dynamic scheduling. For example, if a dynamic HARQ process is still on-going and a PDCCH SPS activation is received (indicated by the SPS C-RNTI), the dynamic process is terminated and the SPS HARQ process overrides existing data, and since the transmission is made on pre-assigned resources, no PDCCH message is sent for the subsequent SPS transmission that follows the SPS activation. On the other hand, if an SPS process is in use and a dynamic HARQ transmission is scheduled (indicated by the C-RNTI), a PDCCH message must be sent. The PDCCH message, comprising a scheduling message, i.e. an uplink Grant or a downlink Assignment, includes a field denoted as NDI (New Data Indicator). The field size is currently 1 bit. The NDI bit is an important indicator to resolve HARQ error cases and has been originally introduced for the dynamic scheduling mode. For dynamic scheduling, i.e. where the first transmission is dynamically scheduled, the NDI bit is toggled with each new transmission. Thus the value can be either 0 or 1 for a new transmission and it will remain the same value for corresponding HARQ retransmissions for a specific MAC Protocol Data Unit, PDU. For downlink transmission this allows the UE to detect whether a new HARQ transmission starts or whether a retransmission is to be expected.

Consequently, it either flushes the HARQ buffer (in case of a new transmission) or it attempts to soft-combine the retransmission with the existing content in the soft-buffer.

For uplink transmission the NDI indicates if the UE is expected to perform a retransmission of the previously transmitted data or if it shall flush the process and obtain new data from higher layers for transmission in the dynamically assigned resource. However, it has been decided that SPS activation will use the value NDI=0 and SPS retransmissions will use the value NDI=1 in the corresponding PDCCH signal. Thus, there exist two different interpretations of the NDI bit depending on the RNTI value used for addressing a User Equipment, UE, on the PDDCH. If the SPS C-RNTI is used, the NDI determines whether SPS will be activated or whether a retransmission is sent.

For dynamically scheduled HARQ processes, the NDI has a different meaning as previously explained. The decision to use the NDI bit for SPS activation and retransmission indication for SPS leads to problems, since a new interpretation is introduced.

When a HARQ process associated with SPS resources should be temporarily used by a dynamically scheduled HARQ transmission, the NDI value can not be applied as in the case where the HARQ process is exclusively scheduled dynamically.

Since the NDI bit is stored in relation to the HARQ process and the HARQ process can be either an SPS process or a dynamically scheduled process, the current specification would lead to an erroneous behavior since the NDI relating to SPS would be interpreted in the context of the dynamic HARQ process, when the first dynamically scheduled HARQ transmission takes place in a process that has been used based on SPS resources before.

SUMMARY

It is the object of this invention to mitigate the above mentioned problems.

One aspect of the invention relates to a method in a user equipment, UE, in connection with a base station in a cellular communication system, for avoiding errors in a HARQ process, wherein an NDI flag is used both for indicating either semi-persistent scheduling, SPS, activation or SPS retransmissions, and for indicating, by toggling of the flag, a new transmission in dynamic scheduling mode. The method comprises the steps of:

receiving, in a scheduling message, an indication that a dynamically scheduled transmission will take place;

if a semi persistent resource has occurred for the same HARQ process since a previously received indication for dynamically scheduled transmission, then considering the NDI flag to be toggled regardless of the value of the NDI flag.

Thus, according to an embodiment of the invention, a previous dynamically scheduled NDI value, received before the HARQ process was used for Semi Persistent Scheduling, SPS, is ignored by the UE, whereby any NDI value, received in a first indication for dynamic scheduling of a transmission after the HARQ process has been used for SPS, is adopted, whereby the NDI flag is regarded as toggled.

Said scheduling message may comprise an uplink grant, by means of which the base station requests a new data transmission from the UE. The UE may use one of the following as an indication that dynamically scheduled transmission will take place: the scheduling message is addressed to the C-RNTI or to the Temporary C-RNTI, or was received in a Random Access response.

Said scheduling message may alternatively comprise a downlink assignment, by means of which the base station indicates a new data transmission to the UE. The UE may use one of the following as an indication that dynamically scheduled transmission will take place: the scheduling message is addressed to the C-RNTI or to the Temporary C-RNTI, or to the RA-RNTI, i.e. the Random Access RNTI.

The UE may receive the scheduling message on a Physical Downlink Control Channel, PDCCH.

A second aspect of the invention relates to a User Equipment, UE, connectable to a base station in a cellular communication system, said UE being configured to avoid errors in a HARQ process, in which an NDI flag is used both for indicating either semi-persistent scheduling, SPS, activation or SPS retransmissions, and for indicating, by toggling of the flag, a new transmission in dynamic scheduling mode. The UE comprises a transceiver unit configured to receive, in a scheduling message, an indication that dynamically scheduled transmission will take place processing unit configured to check if a semi persistent resource has occurred for the same HARQ process since a previously received indication for dynamically scheduled transmission and to consider the NDI flag to be toggled regardless of the value of the NDI flag if said condition is fulfilled.

A third aspect of the invention relates to a method in a base station in connection with a UE in a cellular communication system, for avoiding errors in a HARQ process, wherein an NDI flag is used both for indicating semi-persistent scheduling, SPS, activation and SPS retransmissions and for indicating, by toggling of the flag, a new transmission in dynamic scheduling mode. The method comprises the steps of indicating, in a scheduling message to the UE that dynamically scheduled transmission will take place;

if a semi persistent resource has occurred for the same HARQ process since a previous indication to the UE for dynamically scheduled transmission, then setting the NDI flag to any value and considering the NDI flag to be toggled regardless of the value of the NDI flag.

Thus, according to this embodiment, the method performed by the base station comprises the step of setting the NDI flag to 0 or 1 or an arbitrary value, whereby the UE will regard the NDI value as toggled, independent of the value of the flag.

A fourth aspect of the invention relates to a base station connectable with a UE in a cellular communication system, configured to avoid errors in a HARQ process, the base station being configured to use, in a HARQ process in communication with a UE, an NDI flag both for indicating either semi-persistent scheduling, SPS, activation or SPS retransmissions, and for indicating, by toggling of the flag, a new transmission in dynamic scheduling mode. The base station comprises a scheduling unit configured to schedule a dynamic transmission;

a transceiver unit configured to transmit in a scheduling message to said UE, an indication that dynamically scheduled transmission will take place;

a processing unit configured to check if a semi persistent resource has occurred for the same HARQ process since a previous indication to the UE for dynamically scheduled transmission and to set the NDI flag to any value and consider the NDI flag to be toggled regardless of the value of the NDI flag if said condition is fulfilled.

The base station may for example be an eNodeB. Thus, said base station comprises in this embodiment means for setting a value of the flag (NDI) in a first decision for dynamic scheduling after the HARQ process has been used for SPS to 0 or 1 or an arbitrary value.

According to embodiments of the invention applied in downlink, a User Equipment (UE) performs the check for the previous usage of the HARQ process, whereby the risk that the HARQ receiver might interpret a new transmission as a retransmission, which could lead to errors, is avoided. Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of preferred embodiments as illustrated in the drawings.

FIG. 5 shows a schematic illustration of a User Equipment according to an embodiment of the invention.

FIG. 6 shows a schematic illustration of a base station according to an embodiment of the invention.

DETAILED DESCRIPTION

Figure 1:
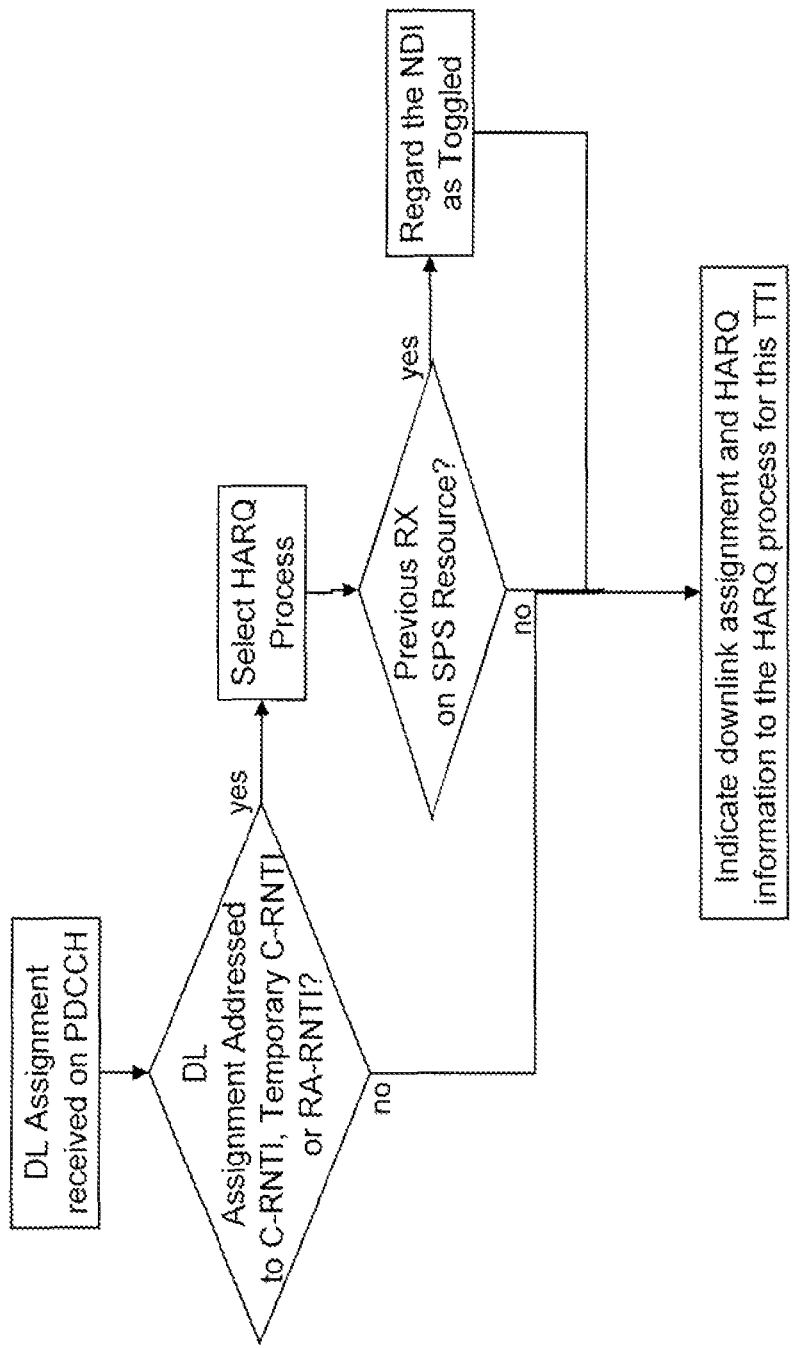
FIG. 1 shows a flowchart for downlink according to an embodiment performed by a UE.

The present invention can be exemplified in the following non-limiting description of embodiments of the invention.

A solution to the problem of having two different interpretations of the NDI bit depending on the C-RNTI value used for addressing a User Equipment, UE, is to ignore the previous dynamically scheduled NDI value, to adopt any NDI received in a first PDCCH message for dynamic scheduling after the HARQ process has been used for SPS and to interpret it as new transmission attempt rather than a retransmission.

An additional condition that is required to avoid HARQ errors is that the PDCCH message is the first PDCCH message for dynamic scheduling after SPS deactivation.

It is possible to start either with a specific NDI value/e.g. always 1 or always 0/or an arbitrary value of 0 and 1.

It is foreseen that the DE checks whether the NDI value in the received PDCCH downlink assignment or uplink grant was incremented (assuming a modulo 2 operation) or, equivalently, toggled compared to the previous value. That is, the received NDI value has been toggled when the NDI value is 1 or 0 compared to a previous value of 0 or 1, respectively.

According to the embodiment of the invention described above, this check is only performed when the HARQ process was occupied in the previous transmission by a dynamically scheduled transmission. If, on the other hand, the resources have been previously used for a semi-persistent transmission and now it is detected that a dynamic transmission shall be performed, then the UE should, according to this embodiment of the invention, consider the NDI value as toggled (regardless of the NDI value in the received PDCCH assignment or grant) and for the uplink case perform a new transmission, and for the downlink case, treat the received transmission as a new transmission.

This embodiment could be implemented according to the following:

For downlink:

DL Assignment Reception

Downlink assignments transmitted on the PDCCH indicate if there is a transmission on the DL-SCH for a particular UE and provide the relevant HARQ information.

When the UE has a C-RNTI, Semi-Persistent Scheduling CRNTI, or Temporary C-RNTI, the UE shall for each TTl during Active Time, for each TTl when a Random Access Response or contention Resolution is expected and for each TTl for which a DL assignment has been configured:

if a downlink assignment for this TTl has been received on the PDCCH for the UE's C-RNTl, or Temporary C-RNTl:

if a Semi Persistent resource has occurred for the same HARQ process since the previous received downlink assignment for the UEs C-RNTl:

consider the NDl to be toggled regardless of the value of the NDl;

indicate the presence of a downlink assignment and deliver the associated HARQ information to the HARQ entity for this TTl.

For downlink there are in principle three ways an SPS resource can occur, namely a DL assignment for a UE's Semi Persistent Scheduling RNTl indicating a new SPS transmission, has been received, thus a Semi Persistent Scheduling resource is (re-) configured/activated;

a DL assignment for a UE's Semi Persistent Scheduling C-RNTl indicating a Semi Persistent Scheduling HARQ retransmission;

the recurrence of a configured SPS downlink assignment and the associated SPS resource occurring according to the periodicity of a scheduling downlink assignment after the (re-) configuration/activation.

For uplink:

UL Grant Reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the UE has a C-RNTI, Semi-Persistent Scheduling C-RNTI, or Temporary C-RNTI, the UE shall for each TTl:

if an uplink grant for this TTl has been received on the PDCCH for the UE's C-RNTI, Semi-Persistent Scheduling C-RNTI or Temporary C-RNTI; or if an uplink grant for this TTl has been received in a Random Access Response:

if a Semi Persistent resource has occurred for the same HARQ process since the previous received uplink grant for the UEs C-RNTI:

consider the NDI to be toggled regardless of the value of the NDI;

deliver the uplink grant and the associated HARQ information to the HARQ entity for this TTl.

Also for uplink there are in principle three ways an SPS resource can occur, namely an UL grant for a UE's Semi Persistent Scheduling CRNTI indicating a new SPS transmission, has been received, thus a Semi Persistent Scheduling resource is (re-) configured/activated;

an UL grant for a UE's Semi Persistent Scheduling CRNTI indicating a Semi Persistent Scheduling HARQ retransmission;

the recurrence of a configured SPS uplink grant and the associated SPS resource occurring according to the periodicity of a scheduling uplink grant after the (re) configuration/activation.

According to the current E-UTRA standard specification for the MAC protocol, TS 36.321 v8.2.0, the identifier that a dynamic transmission shall be performed is the C-RNTI (Cell Radio Network Temporary Identity), Temporary C-RNTI or RARNTI value.

If, on the other hand, the SPS C-RNTI is received, a retransmission for the semi-persistent process shall be performed. HARQ is asynchronous in downlink, meaning that the scheduler is free to schedule any HARQ process at any given point in time. Therefore it has to signal the HARQ process ID.

In uplink the HARQ is synchronous, meaning that the HARQ process has a timing pattern. Thus the HARQ process ID is known without PDCCH signaling.

FIG. 1 shows an embodiment of the invention for downlink performed by a UE. In a first step, the UE receives a DL assignment on PDCCH. The RNTI that is used for this assignment indicates a dynamically scheduled transmission. The HARQ process ID is included in the PDCCH assignment and the UE retrieves it from there and selects the correct process. If the previous reception, HARQ process was on an SPS resource, RX, for the particular then the UE regards the NDI flag as toggled, meaning that the received transmission is treated as a new transmission.

Figure 2:
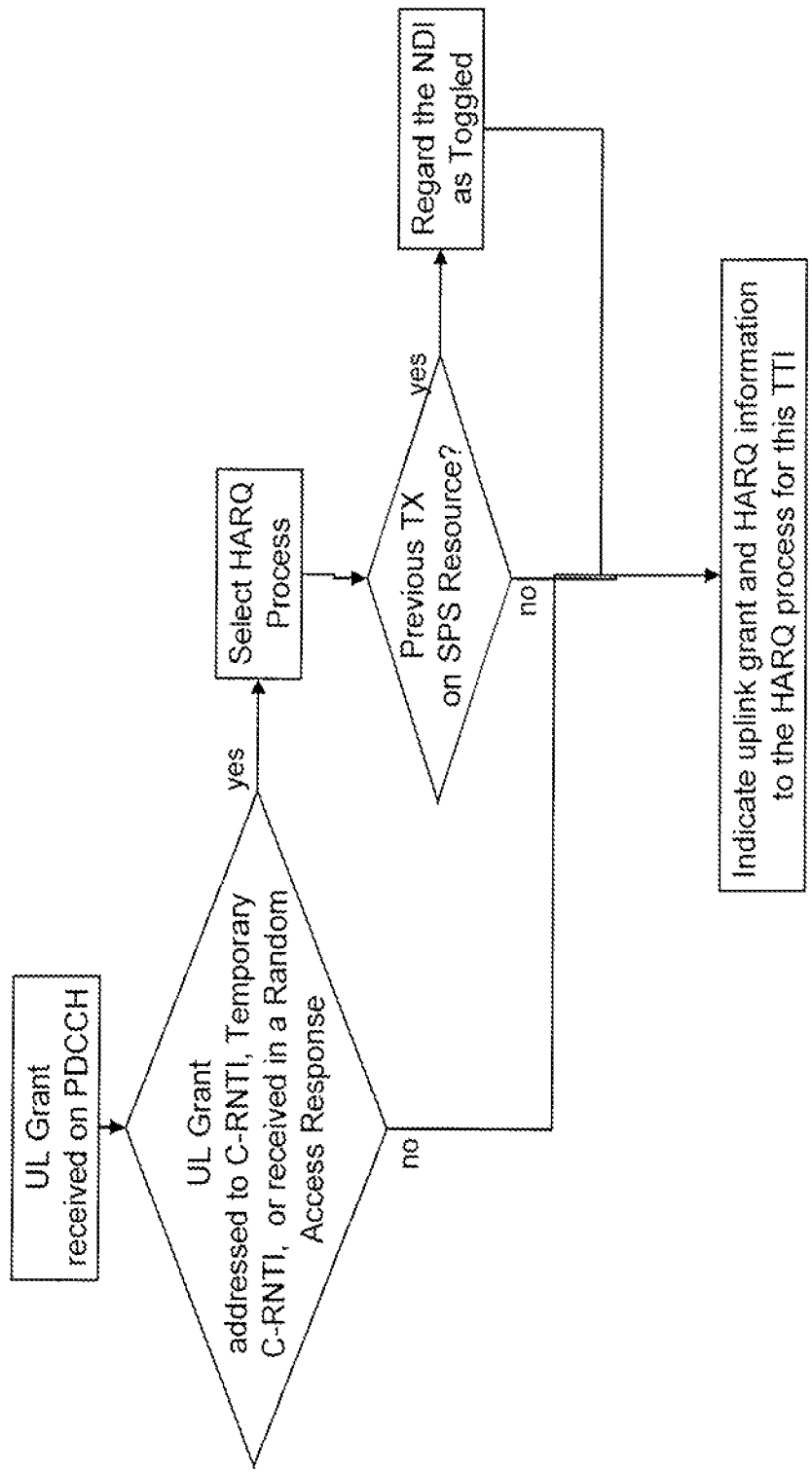
FIG. 2 shows a flowchart for uplink according to an embodiment performed by a UE.

FIG. 2 shows an embodiment of the invention for uplink performed by a UE. In a first step, an UL grant is received on the PDCCH. The RNTI that is used for this grant indicates a dynamically scheduled transmission. The HARQ process ID is coupled to the timing of the grant and the UE knows which process it should use at a given TTl, Transmission Time Interval. If the previous transmission, TX, for the particular HARQ process was on an SPS resource, then the UE regards the NDI flag as toggled and in the next step indicates uplink grant and HARQ information to the HARQ entity for the TTl in question.

Figure 3:
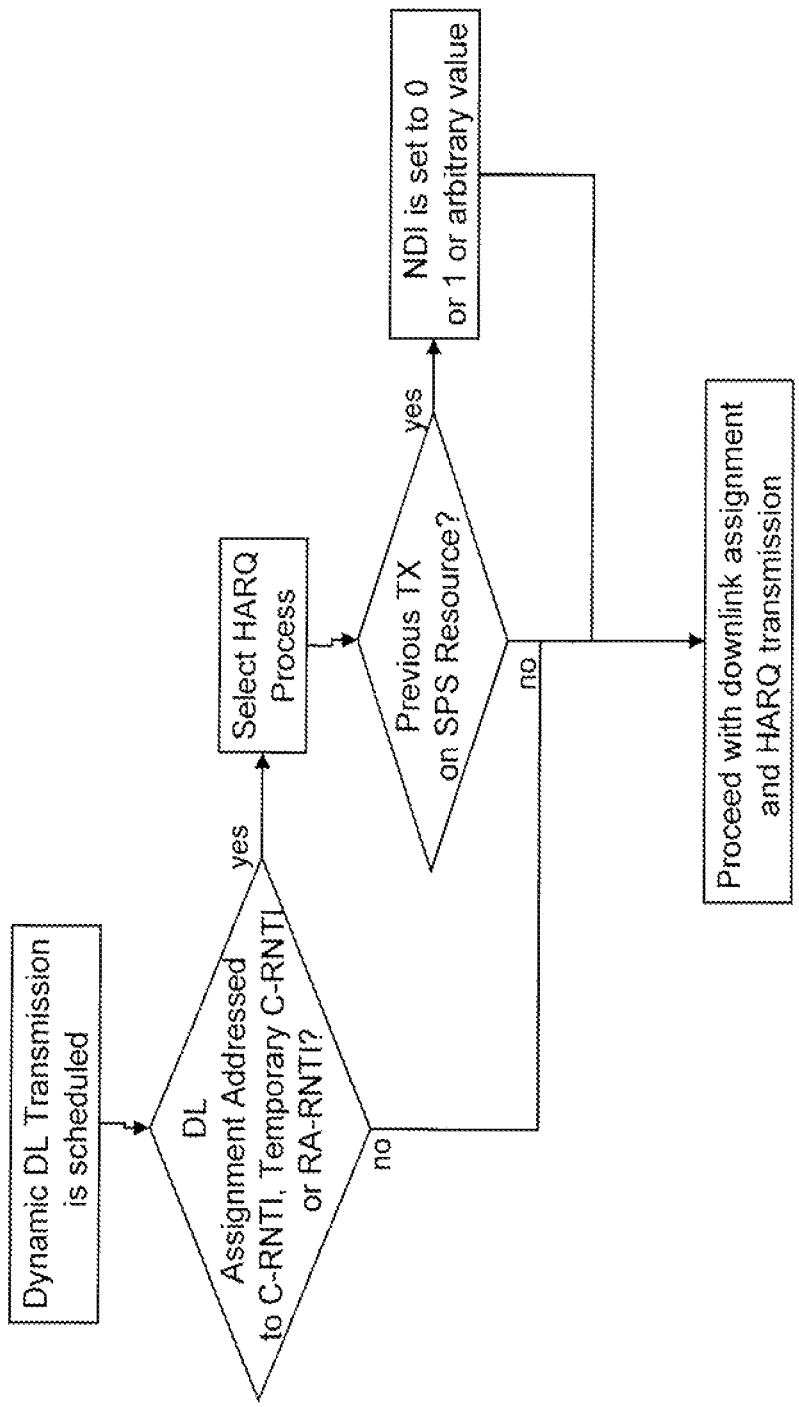
FIG. 3 shows a flowchart for downlink according to an embodiment performed by a base station.

FIG. 3 shows an embodiment of the invention for downlink performed by a base station. In a first step, a dynamic downlink transmission is scheduled. The RNTI that is used for the downlink assignment to the UE indicates a dynamically scheduled transmission. If the previous transmission, TX, for the particular HARQ process was on an SPS resource, then the NDI value is set to either 1 or 0, or an arbitrary value of 0 and 1. Thereafter the base station proceeds with the transmission of downlink assignment and HARQ transmission.

Figure 4:
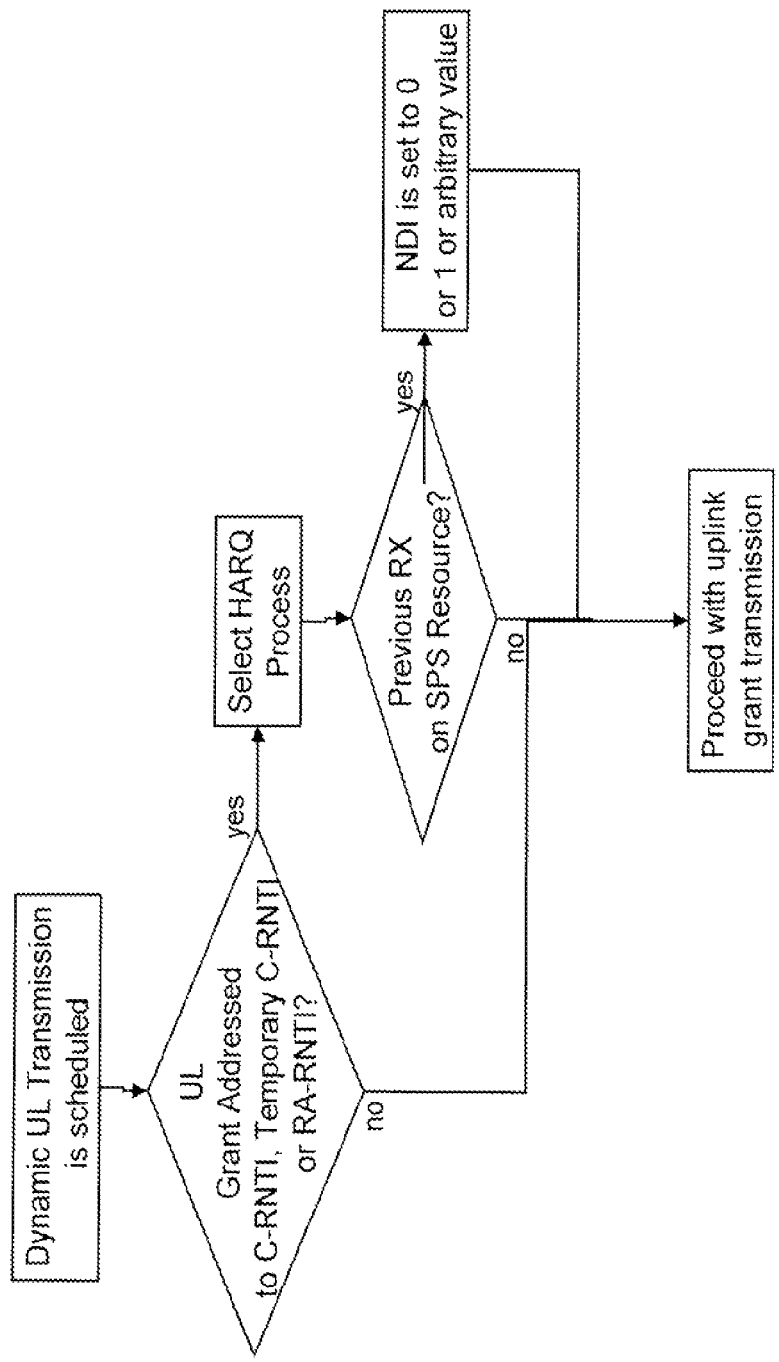
FIG. 4 shows a flowchart for uplink according to an embodiment performed by a base station.

FIG. 4 shows an embodiment of the invention for uplink performed by a base station. In a first step, a dynamic uplink transmission is scheduled. The RNTI that is used for the uplink grant indicates a dynamically scheduled transmission. If the previous reception, RX, for the particular HARQ process was on an SPS resource, then the NDI value is set to either 1 or 0, or an arbitrary value of 0 and 1. Thereafter the base station proceeds with uplink grant transmission. In the embodiments shown in FIGS. 3 and 4, the base station thus adopts the set NDI value as status for the respective HARQ process such that it is able to send the same value again if a retransmission is requested. For that purpose the base station stores the NDI value as part of the HARQ status information.

FIG. 5 illustrates schematically a user equipment 500 according to an embodiment of the invention, comprising a transceiver 510, via which the UE receives a downlink assignment or an uplink grant from the base station that the UE is connected to. The UE can for example receive such messages on a Physical Downlink Control Channel, PDCCH. A processing unit 520 is configured to check if a semi persistent resource has occurred for the particular HARQ process since a previously received downlink assignment or uplink grant. The processing unit is furthermore configured to consider the NDI flag that is included in the downlink assignment or uplink grant to be toggled regardless of the value of the NDI flag if said condition is fulfilled. Thus, by considering the NDI flag as toggled, the UE will for the downlink case treat a received HARQ transmission as a new transmission. For the uplink case, the UE will indicate uplink grant and deliver the associated HARQ information to the HARQ entity for this TTl. Thus, the UE comprises in this embodiment means for adopting a value of the flag (NDI) received in a first indication for dynamic scheduling after the HARQ process has been used for SPS, and means for regarding said NDI flag as toggled.

FIG. 6 illustrates schematically a base station 600 according to an embodiment of the invention, adapted to communicate with one or more user equipments, UEs. The base station comprises a scheduling unit 601 configured to schedule a dynamic uplink or downlink transmission from or to a UE connected to said base station. The base station furthermore comprises a transceiver unit 610 configured to transmit in a downlink assignment or an uplink grant to said UE, an indication that a dynamically scheduled transmission will take place. A processing unit 620 is configured to check if a semi persistent resource has occurred for the particular HARQ process since a previously received downlink assignment or uplink grant and to set an NDI value that the UE (500) will regard as toggled regardless of the value of the NDI flag if said condition is fulfilled.

Figure 7:
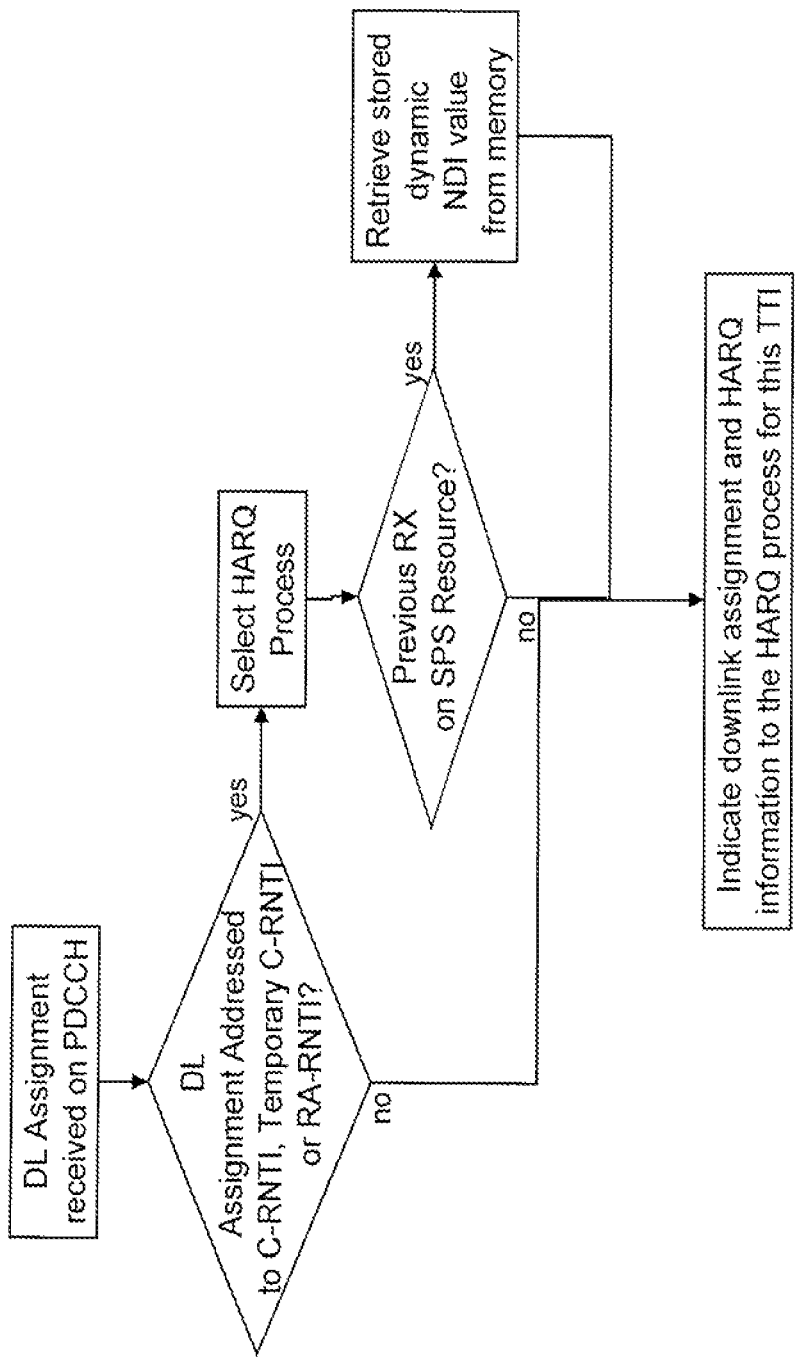
FIG. 7 shows a flowchart for downlink according to an alternative embodiment performed by a UE.

An alternative solution to the problem of having two different interpretations of the NDI bit depending on the RNTI value used for addressing a User Equipment, UE, could be to store the last NDI value of the last dynamically scheduled transmission attempt at the receiver and the sender side for as long as the process is associated with a semi-persistent resource allocation. After using the HARQ process for semi-persistent scheduling, the stored NDI value needs to be retrieved when the SPS usage is revoked and dynamic scheduling is applied, such that a dynamically scheduled HARQ transmission should take place. Thus, according to this embodiment, the dynamic NDI value needs to be stored at both the sender and receiver, and retrieved when the HARQ process is for the first time used as dynamic process after it has been used by SPS before. FIG. 7 shows this alternative embodiment of the invention for downlink performed by a UE. The UE receives a DL assignment on PDCCH in a first step. The HARQ process ID is included in the PDCCH assignment and the DE retrieves it from there and selects the correct process.

If the previous reception, RX, for the particular HARQ process was on an SPS resource, then the UE retrieves the stored dynamic NDI value from a memory before the last step where it indicates downlink assignment and HARQ information to the HARQ process for the TTl in question.

Figure 8:
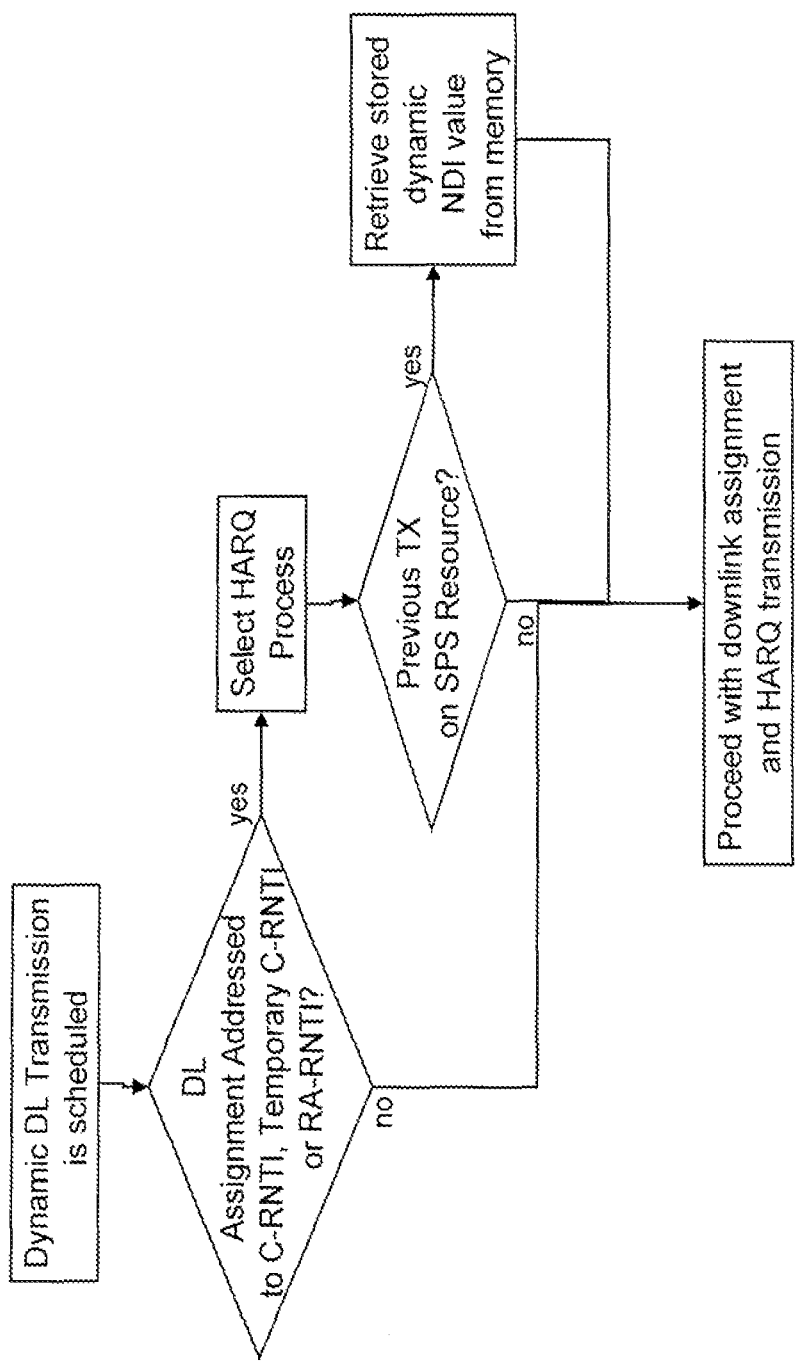
FIG. 8 shows a flowchart for downlink according to an alternative embodiment performed by a base station.

FIG. 8 shows this alternative embodiment of the invention for downlink performed by a base station such as an eNodeB. In a first step, a dynamic downlink transmission is scheduled. If the previous transmission, TX, for the particular HARQ process was on an SPS resource, then the base station retrieve a stored dynamic NDI value from a memory and thereafter proceeds with downlink assignment and HARQ transmission.

Figure 9:
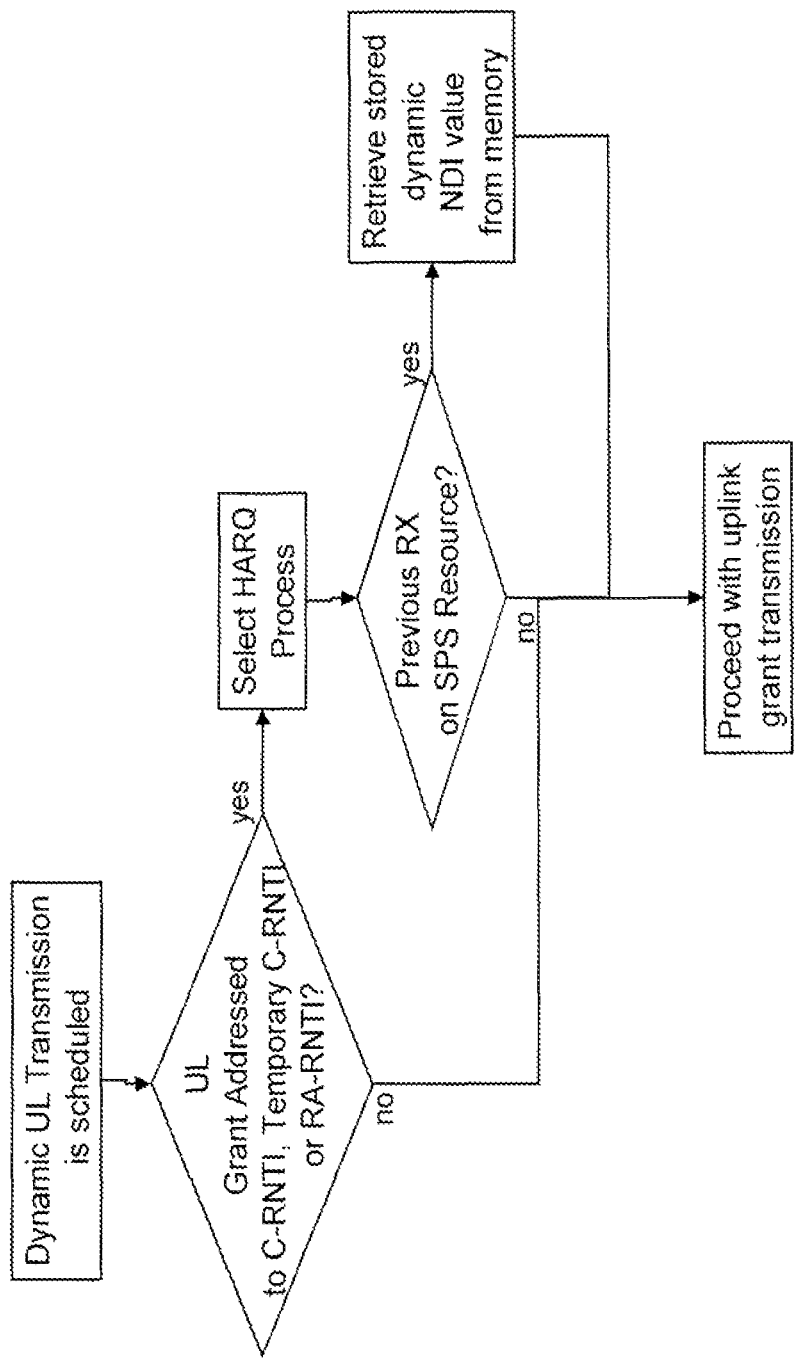
FIG. 9 shows a flowchart for uplink according to an alternative embodiment performed by a base station.

FIG. 9 shows this alternative embodiment of the invention for uplink performed by a base station. In a first step, a dynamic uplink transmission is scheduled. If the previous reception, RX, for the particular HARQ process was on an SPS resource, then the base station retrieves a stored dynamic NDI value from a memory and thereafter proceeds with uplink grant transmission.

Thus, the method performed by the base station according to this alternative embodiment comprises the step of storing the last NDI value that is used for dynamic scheduling for as long as the process is associated with a semi-persistent resource allocation. The stored NDI value is retrieved when the SPS usage is revoked and dynamic scheduling is applied.

Figure 10:
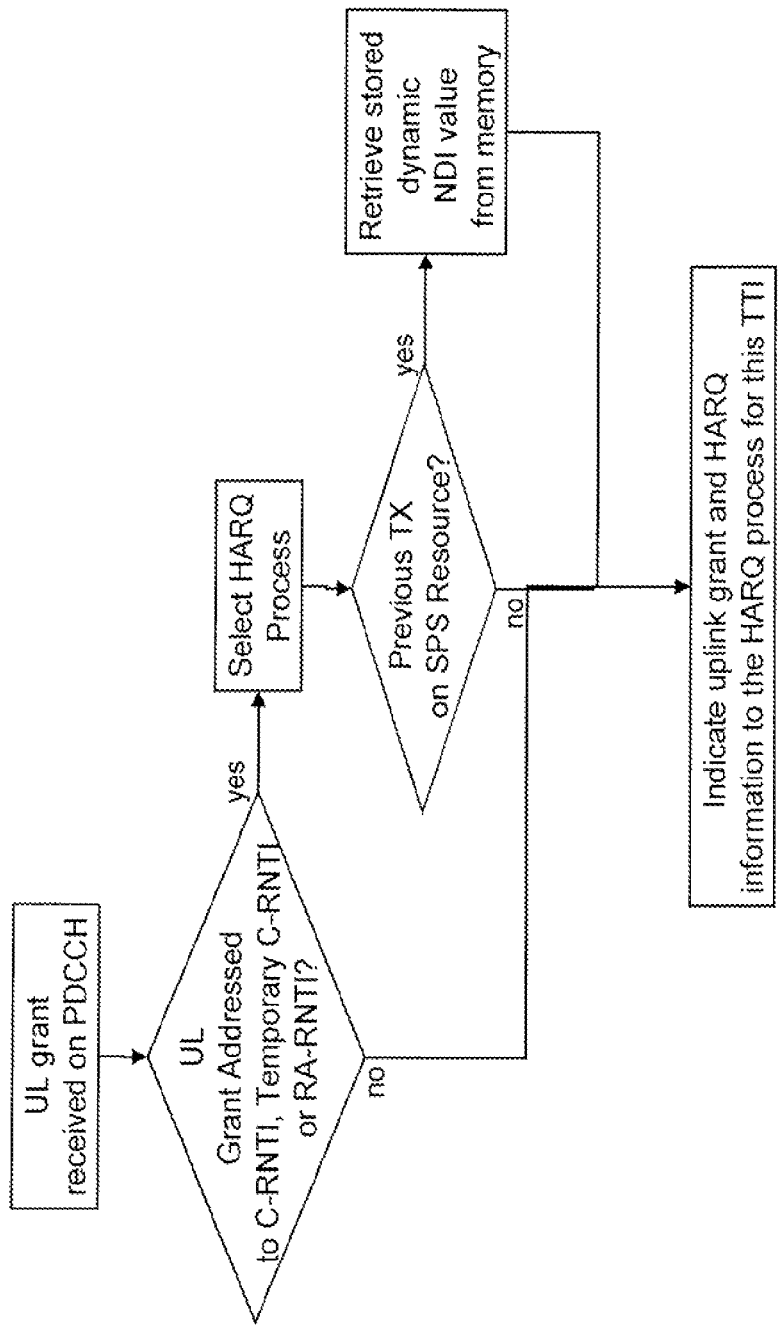
FIG. 10 shows a flowchart for uplink according to an alternative embodiment performed by a UE.

FIG. 10 shows this alternative embodiment of the invention for uplink performed by a UE. The UE receives an UL grant on PDCCH in a first step. The HARQ process ID is included in the PDCCH grant and the UE retrieves it from there and selects the correct process. If the previous transmission, TX, for the particular HARQ process was on an SPS resource, then the UE retrieves the stored dynamic NDI value from a memory before the last step where it indicates uplink grant and HARQ information to the HARQ process for the TTl in question. A UE may in said alternative embodiment comprise means such as a memory for storing the value of the flag (NDI) for as long as the HARQ process is associated with a semi-persistent resource allocation and means such as a processing unit for retrieving the stored NDI value when the SPS usage is revoked and dynamic scheduling is applied.

A base station according said alternative embodiment may comprise means for storing the value of the flag (NDI) for as long as the HARQ process is associated with a semi-persistent resource allocation and means for retrieving the stored NDI value when the SPS usage is revoked and dynamic scheduling is applied.

Yet another alternative solution to the problem would be to separate the HARQ processes for SPS and dynamic scheduling in a way that they still use the same HARQ process ID, but that the respective RNTls, i.e. the SPS C-RNTI or the C-RNTI, are used as additional pointers to the realization of the HARQ process, either for SPS or for dynamic scheduling. This includes that state variables belonging to each HARQ process are treated independent of each other. In essence, the instances of the two HARQ processes could be operated simultaneously and independently of each other. For example, there would be both an SP-NDI variable and a normal NDI variable for dynamic scheduling. Similarly, the soft buffer of both processes would be used independently.

The present invention may be carried out in other ways than those specifically set forth herein without departing from essential characteristics of the invention. The present embodiments are to be considered in all respects as illustrative and not restrictive

ABBREVIATIONS

PDCCH—Physical Downlink Control Channel
HARQ—Hybrid ARQ
SPS C-RNTI—Semi-Persistent Scheduling Cell Radio Network Temporary Identifier
RA-RNTI—Random Access Identifier Radio Network Temporary
C-RNTI—Cell Radio Network Temporary Identifier
NDI—New Data Indicator

REFERENCES

E-UTRA MAC Specification 36.321 v8.2.0

What is claimed:

1. A method in a user equipment (UE) in connection with a base station in a cellular communication system, for avoiding errors in a Hybrid Automatic Repeat reQuest (HARQ) process, wherein at least two scheduling modes are supported including a dynamic scheduling mode in which the UE receives scheduling messages from the base station indicating which resources have been allocated for uplink and downlink transmission, and a semi-persistent scheduling (SPS) mode in which new transmissions are performed on pre-assigned resources, and wherein a New Data Indicator (NDI) flag included in a scheduling message for SPS mode is interpreted as indicating either SPS activation or SPS retransmissions, and an NDI flag included in a scheduling message for dynamic scheduling mode is interpreted as indicating, by toggling of the flag, a new transmission in dynamic scheduling mode, the method comprising:

receiving, in a scheduling message, an indication that dynamically scheduled transmission will take place for a first HARQ process; and if a previous transmission that occurred for the first HARQ process before the indication was received used a semi persistent resource, then considering the NDI flag to be toggled regardless of the value of the NDI flag, whereby the received indication is interpreted as an indication of a new transmission.

2. The method according to claim 1, wherein said scheduling message comprises an uplink grant, by means of which the base station requests a new data transmission from the UE.

3. The method according to claim 2, wherein the UE uses one of the following as an indication that dynamically scheduled transmission will take place: the scheduling message is addressed to the C-RNTI or to the Temporary C-RNTI, or was received in a Random Access response.

4. The method according to claim 1, wherein said scheduling message comprises a downlink assignment, by means of which the base station indicates a new data transmission to the UE.

5. The method according to claim 4, wherein the UE uses one of the following as an indication that dynamically scheduled transmission will take place: the scheduling message is addressed to the C-RNTI or to the Temporary C-RNTI, or to the RA-RNTI, i.e. the Random Access RNTI.

6. The method according claim 1, wherein the UE receives the scheduling message on a Physical Downlink Control Channel, PDCCH.

7. A User Equipment (UE) connectable to a base station in a cellular communication system, said UE being configured to avoid errors in a Hybrid Automatic Repeat reQuest (HARQ) process, wherein the UE supports at least two scheduling modes including a dynamic scheduling mode in which the UE receives scheduling messages from the base station indicating which resources have been allocated for uplink and downlink transmission, and a semi-persistent scheduling (SPS) mode wherein new transmissions are performed on pre-assigned resources, and wherein a New Data Indicator (NDI) flag included in a scheduling message for SPS mode is interpreted as indicating either SPS activation or SPS retransmissions, and an NDI flag included in a scheduling message for dynamic scheduling mode is interpreted as indicating, by toggling of the flag, a new transmission in dynamic scheduling mode, the UE comprising:

a transceiver unit configured to receive, in a scheduling message, an indication that dynamically scheduled transmission will take place for a first HARQ process; and a processing unit configured to check if a previous transmission that occurred for the first HARQ process before the indication was received used a semi-persistent resource and to consider the NDI flag to be toggled regardless of the value of the NDI flag if said condition is fulfilled, whereby the received indication is interpreted as an indication of a new transmission.

8. The UE according to claim 7, wherein said scheduling message comprises an uplink grant, by means of which the base station requests a new data transmission from the UE.

9. The UE according to claim 8, wherein the UE is configured to use one of the following as an indication that dynamically scheduled transmission will take place:
the scheduling message is addressed to the C-RNTI or to the Temporary C-RNTI, or was received in a Random Access response.

10. The UE according to claim 7, wherein said scheduling message comprises a downlink assignment, by means of which the base station indicates a new data transmission to the UE.

11. The UE according to claim 10, wherein the UE is configured to use one of the following as an indication that dynamically scheduled transmission will take place:
the scheduling message is addressed to the C-RNTI or to the Temporary C-RNTI, or to the RA-RNTI, i.e. the Random Access RNTI.

12. The UE according to claim 7, wherein the transceiver unit is configured to receive the scheduling message on a Physical Downlink Control Channel (PDCCH).

13. A method in a base station in connection with a user equipment (UE) in a cellular communication system, for avoiding errors in a Hybrid Automatic Repeat reQuest (HARQ) process, wherein a plurality of scheduling modes are supported including a dynamic scheduling mode in which the UE receives scheduling messages from the base station indicating which resources have been allocated for uplink and downlink transmission, and a semi-persistent scheduling (SPS) mode in which new transmissions are performed on pre-assigned resources, and wherein a New Data Indicator (NDI) flag included in a scheduling message for SPS mode is interpreted as indicating either SPS activation or SPS retransmissions and an NDI flag included in a scheduling message for dynamic scheduling mode is interpreted as indicating, by toggling of the flag, a new transmission in dynamic scheduling mode, the method comprising:

indicating, in a scheduling message to the UE that dynamically scheduled transmission will take place for a first HARQ process; and if a previous transmission that occurred for the first HARQ process before the indication was sent used a semi persistent resource, then setting an NDI flag in the scheduling message to any value and adopting this value as status for the HARQ process in question, whereby the sent indication indicates to the UE that a transmission corresponding to the sent indication will be a new transmission.

14. The method according to claim 13, wherein the step of setting the NDI value comprises setting a specific NDI.

15. The method according to claim 13, wherein the step of setting the NDI value comprises setting an arbitrary value of 0 and 1.

16. A base station connectable with a user equipment (UE) in a cellular communication system, configured to avoid errors in a Hybrid Automatic Repeat reQuest (HARQ) process, wherein the base station supports a plurality of scheduling modes including a dynamic scheduling mode in which the base station transmits scheduling messages to the UE indicating which resources have been allocated for uplink and downlink transmission, and a semi-persistent scheduling (SPS) mode in which new transmissions are performed on pre-assigned resources, the base station being configured to use a New Data Indicator (NDI) flag included in a scheduling message for SPS mode to indicate either SPS activation or SPS retransmissions, and an NDI flag included in a scheduling message for dynamic scheduling mode to indicate, by toggling of the flag, a new transmission in dynamic scheduling mode, said base station comprising:

a scheduling unit configured to schedule a dynamic transmission;

a transceiver unit configured to transmit in a scheduling message to said UE, an indication that dynamically scheduled transmission will take place for a first HARQ process; and a processing unit configured to check if a previous transmission that occurred for the first HARQ process before the indication was sent used a semi persistent resource and to set an NDI flag in the scheduling message to any value and adopt this value as status for the HARQ process in question if said condition is fulfilled, whereby the transmitted indication indicates to the UE that a transmission corresponding to the sent indication will be a new transmission.

17. The base station according to claim 16, wherein the processing unit is configured to always set a specific NDI.

18. The base station according to claim 16, wherein the processing unit is configured to set the NDI value to an arbitrary value of 0 and 1.

* * * * *

UNITED STATES PATENT AND TRADEMARK OFFICE
CERTIFICATE OF CORRECTION

| | | |
|---|---|---|
| PATENT NO. | : 8,908,630 B2 | |
| APPLICATION NO. | : 13/958698 | |
| DATED | : December 9, 2014 | |
| INVENTOR(S) | : Meyer et al. | |

It is certified that error appears in the above-identified patent and that said Letters Patent is hereby corrected as shown below:

In the Specification

In Column 4, Line 26, delete "processing" and insert -- a processing --, therefor.

In Column 4, Line 60, delete "transmission;" and insert -- transmission: --, therefor.

In Column 5, Line 33, delete "invention." and insert -- invention; --, therefor.

In Column 5, Line 35, delete "invention." and insert -- invention; --, therefor.

In Column 6, Line 21, delete "C-RNTl," and insert -- C-RNTI, --, therefor.

In Column 6, Line 22, delete "CRNTl, or Temporary C-RNTl, the UE shall for each TTl" and insert -- C-RNTI, or Temporary C-RNTI, the UE shall for each TTI --, therefor.

In Column 6, Line 23, delete "TTl when" and insert -- TTI when --, therefor.

In Column 6, Line 25, delete "TTl" and insert -- TTI --, therefor.

In Column 6, Line 26, delete "TTl" and insert -- TTI --, therefor.

In Column 6, Line 27, delete "C-RNTl," and insert -- C-RNTI, --, therefor.

In Column 6, Line 28, delete "C-RNTl:" and insert -- C-RNTI: --, therefor.

In Column 6, Line 31, delete "C-RNTl:" and insert -- C-RNTI: --, therefor.

In Column 6, Line 32, delete "NDl" and insert -- NDI --, therefor.

Signed and Sealed this
Fourteenth Day of July, 2015

Michelle K. Lee
*Director of the United States Patent and Trademark Office*

CERTIFICATE OF CORRECTION (continued)
U.S. Pat. No. 8,908,630 B2

In Column 6, Line 33, delete "NDl;" and insert -- NDI; --, therefor.

In Column 6, Line 36, delete "TTl." and insert -- TTI. --, therefor.

In Column 6, Line 44, delete "C-RNTl" and insert -- C-RNTI --, therefor.

In Column 6, Line 59, delete "TTl:" and insert -- TTI: --, therefor.

In Column 6, Line 60, delete "TTl" and insert -- TTI --, therefor.

In Column 6, Line 63, delete "TTl" and insert -- TTI --, therefor.

In Column 7, Line 4, delete "TTl." and insert -- TTI. --, therefor.

In Column 7, Line 47, delete "TTl," and insert -- TTI, --, therefor.

In Column 7, Line 51, delete "TTl" and insert -- TTI --, therefor.

In Column 8, Line 25, delete "TTl." and insert -- TTI. --, therefor.

In Column 9, Line 2, delete "TTl" and insert -- TTI --, therefor.

In Column 9, Line 32, delete "TTl" and insert -- TTI --, therefor.

In the Claims

In Column 10, Line 54, in Claim 6, delete "according claim 1," and insert -- according to claim 1, --, therefor.